(12) United States Patent
Iandoli et al.

(10) Patent No.: US 7,486,280 B2
(45) Date of Patent: Feb. 3, 2009

(54) CONTOURED CAPACITIVE TOUCH CONTROL PANEL

(75) Inventors: Raymond Charles Iandoli, Longwood, FL (US); Peh Swee Leong, Singapore (SG)

(73) Assignee: Uniplas Enterprises Pte, Ltd., Singapore (SG)

( * ) Notice: Subject to any disclaimer, the term of this patent is extended or adjusted under 35 U.S.C. 154(b) by 677 days.

(21) Appl. No.: 11/196,845

(22) Filed: Aug. 4, 2005

(65) Prior Publication Data

US 2007/0031161 A1  Feb. 8, 2007

(51) Int. Cl.
  *G06F 3/41*  (2006.01)
(52) U.S. Cl. ........................ 345/173; 345/178
(58) Field of Classification Search ................ 345/173, 345/174, 418, 581, 179; 178/20.01, 20.02; 399/184, 6, 82, 21, 81, 407; 264/132, 161, 264/493, 342 R; 368/205; 463/1, 16; 51/298
See application file for complete search history.

(56) References Cited

U.S. PATENT DOCUMENTS

| | | | |
|---|---|---|---|
| 3,983,553 A * | 9/1976 | Kesling | 341/27 |
| 4,085,302 A * | 4/1978 | Zenk et al. | 200/5 A |
| 4,680,429 A * | 7/1987 | Murdock et al. | 178/20.02 |
| 4,698,460 A * | 10/1987 | Krein et al. | 345/173 |
| 4,698,461 A * | 10/1987 | Meadows et al. | 345/174 |
| 4,707,845 A * | 11/1987 | Krein et al. | 178/20.01 |
| 4,725,695 A * | 2/1988 | Murdock et al. | 345/174 |
| 4,794,421 A * | 12/1988 | Stoudt et al. | 399/184 |
| 4,887,128 A * | 12/1989 | Jamali et al. | 399/6 |
| 5,053,757 A * | 10/1991 | Meadows | 345/173 |
| 5,757,125 A * | 5/1998 | Furlong et al. | 313/503 |
| 6,066,830 A * | 5/2000 | Cline et al. | 219/121.69 |
| 6,217,147 B1* | 4/2001 | Holstun | 347/40 |
| 6,314,880 B1* | 11/2001 | Lampinski | 101/170 |
| 6,618,170 B1* | 9/2003 | Whiting et al. | 358/1.9 |
| 6,871,782 B2* | 3/2005 | Keronen et al. | 235/380 |
| 6,874,420 B2* | 4/2005 | Lewis et al. | 101/485 |
| 7,158,123 B2* | 1/2007 | Myers et al. | 345/173 |
| 2002/0002069 A1* | 1/2002 | Keronen et al. | 463/1 |
| 2004/0095739 A1* | 5/2004 | Parker et al. | 362/26 |
| 2004/0127270 A1* | 7/2004 | Wulff et al. | 455/575.4 |
| 2005/0113163 A1* | 5/2005 | Mattice et al. | 463/16 |
| 2005/0117456 A1* | 6/2005 | Fox et al. | 368/10 |
| 2006/0156634 A1* | 7/2006 | Welygan et al. | 51/298 |

* cited by examiner

*Primary Examiner*—Prabodh M. Dharia
(74) *Attorney, Agent, or Firm*—James H. Beusse; Beusse Wolter Sanks Mora & Maire, P.A.

(57) ABSTRACT

A method of manufacturing a contoured capacitive touch screen control panel includes printing control indicia on at least one of a front surface and a back surface of a flexible film and printing conductive ink pads on a back surface of the film in alignment with the control indicia. The printed film is placed in an injection mold with the conductive pads in contact with a back surface of the mold so that a space remains between the front surface of the flexible film and a front surface of the mold. The method then includes flowing a molten plastic into the space in engagement with the front surface of the film to form a control panel with the printed indicia being visible through the control panel from a face of the control panel opposite from the film.

13 Claims, 2 Drawing Sheets

CONTOURED CAPACITIVE TOUCH CONTROL PANEL

FIELD OF THE INVENTION

The present invention relates to control panel manufacturing, and, in particular, to a method for manufacturing a contoured capacitive touch control panel.

BACKGROUND OF THE INVENTION

Flat capacitive control touch control panels have been used to control appliance functions, especially in environments that may be detrimental to conventional switch operated control panels. Various printing techniques are used to apply indicia to flat surfaces. Plastic injection molding techniques are commonly used to form plastic articles having contoured shapes.

DESCRIPTION OF PREFERRED EMBODIMENTS

Printing of contoured surfaces has proved difficult to achieve, especially in the field of capacitive touch control panels. The inventors of the present invention have developed an innovative technique for producing capacitive touch control panels that solves the problems inherent in attempting to manufacture printed contoured surfaces using injection molding and printed films.

Figure 1:
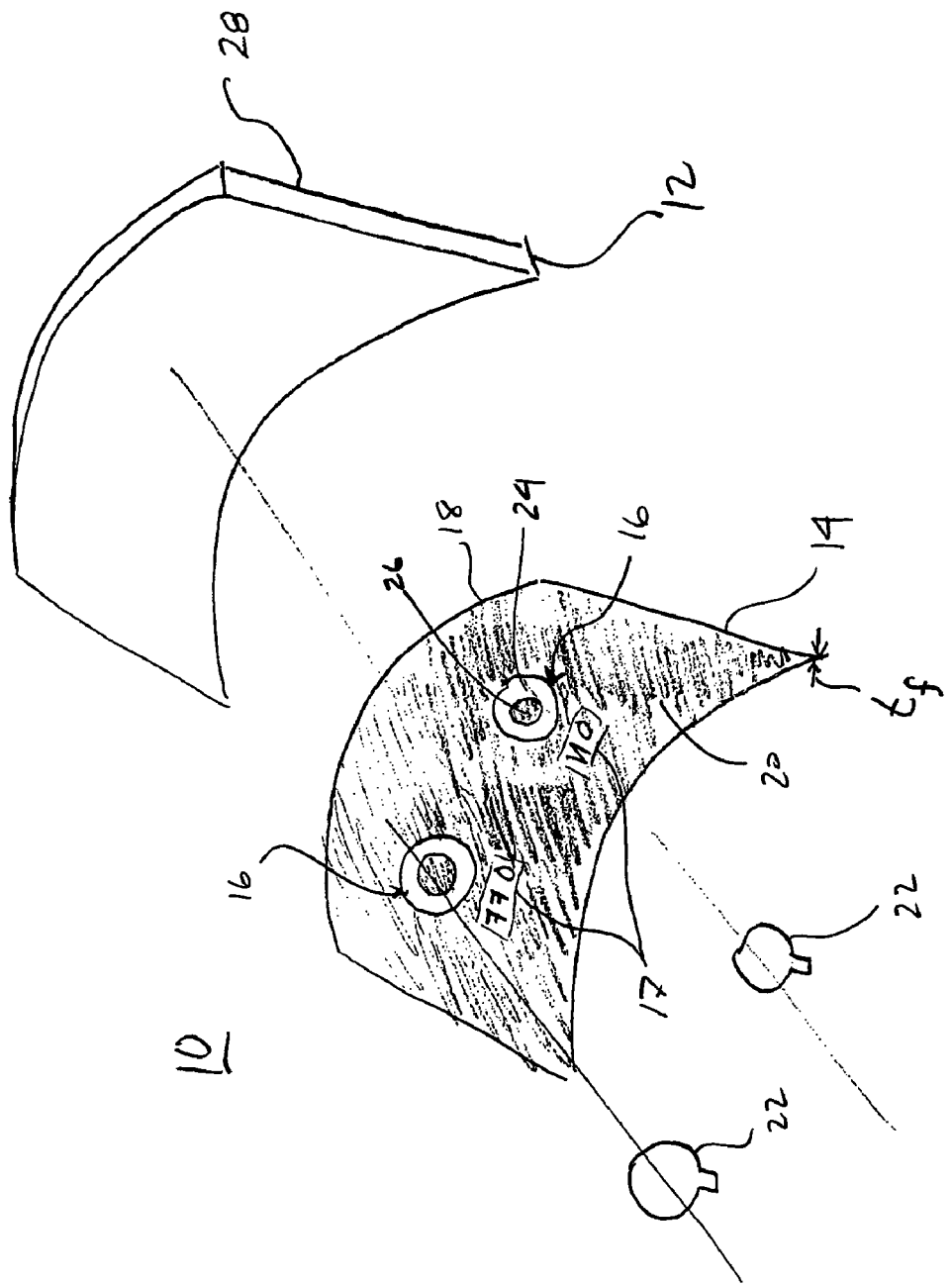
FIG. 1 is an exploded perspective view of an exemplary embodiment of a contoured capacitive touch control panel.

FIG. 1 is an exploded perspective view of an exemplary embodiment of a contoured capacitive touch control panel 10. The control panel 10 may include a contoured cover 12, molded, for example, from a translucent or transparent plastic, such as an acrylic or a polycarbonate. The cover 12 may be formed using conventional plastic injection molding techniques. In an aspect of the invention, a flexible film 14 may be injection molded in situ with the contoured cover 12. The film 14 may include indicia 16, 17 printed on a front surface 18 or back surface 20 of the film 14 so that the indicia 16,17 is visible though the cover 12 when the film 14 is molded in situ with the cover 12. In an aspect of the invention, the film 14 may be a translucent or transparent film. The film 14 may include a polycarbonate, a polyethylene terephthalate (PET), polyester, and/or an acrylic material, and may include multiple layers of film. Suitable films may include OQ1030 Lexan®, available from General Electric Corporation, Mylar® or Melinex®, available from DuPont Corporation, or similar products such as polyester films available from Mitsubishi Plastic, Incorporated, or SKC Company, Limited. The film 14 may be sufficiently flexible to allow the film 14 to be shaped to conform to a desired contour, or the film may be formed to have a desired contour, such as by using vacuum forming techniques or pressure forming techniques, such as a Niebling process. The film 14 may have a thickness $t_f$ of between about 0.1 mm and 0.2 mm, and preferably may have a thickness $t_f$ between about 0.125 mm and 0.175 mm.

The indicia 16, 17 may include opaque printed portions 26 and/or clear, unprinted portions 24 that allow light transmission therethrough. At least some of the indicia 16 may correspond to control features of the control panel 10, such as "On" and "Off" buttons, while other indicia 17 may serve as condition indicators. In an embodiment of the invention, conductive ink pads 22 may be printed on the back surface 20 of the film 14, with each pad 22 being aligned with respective control indicia 16 printed on the film 14 so that the control features may be operable, for example, via capacitive coupling initiated by a user placing a finger over the indicia 16 at a face 28 of the control panel 10. In an aspect of the invention, the conductive ink used to print the conductive ink pads 22 may be a clear conductive ink, such as Orgacon ink product numbers EL-P 3040, EL-P 4020, 5/1, and 5/2 (CHEMINFO number 010541) available from Agfa, Incorporated. When the control panel 10 is installed in a controlled device, the conductive ink pads 22 of the control panel 10 may be placed in communication with suitable electronic circuitry for sensing capacitive coupling and controlling the device accordingly.

A method of manufacturing the contoured capacitive touch screen control panel 10 described above may include printing control indicia, such as indicia 16, 17, on at least one surface 18, 20 of the flexible film 14. Advantageously, the film 14 may be printed in a flat state using a printing technique such as a gravure process, offset lithography, tampo printing, screen printing, and/or digital printing. Conductive ink pads 22 may be printed on the back surface 20 of the film 14 with each pad 22 being aligned with respective control indicia 16 printed on the film 14. In an aspect of the invention, the control indicia 16 may be printed on the front surface 18 and the corresponding conductive ink pads 22 may be printed on the back surface 20.

Figure 2:
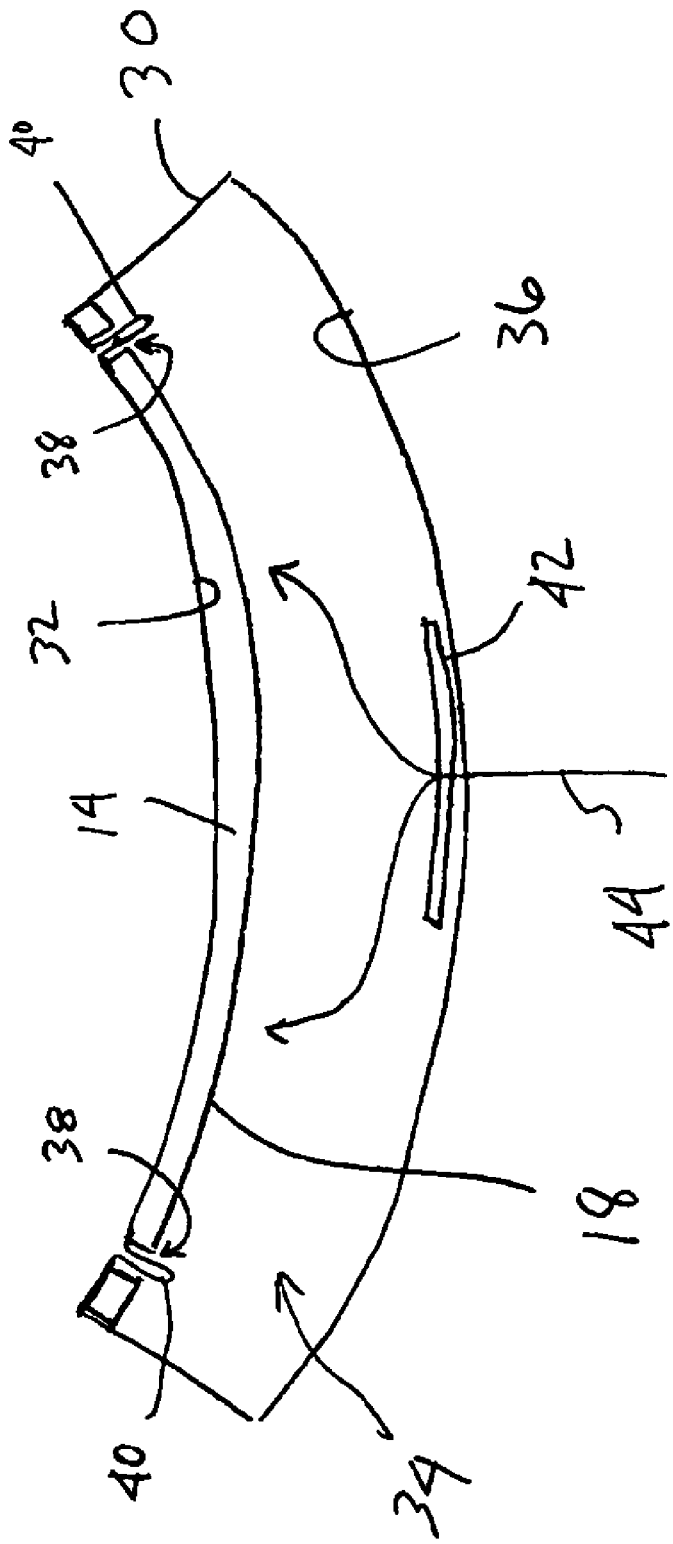
FIG. 2 is a cross section view of an exemplary plastic injection mold used to produce an injection molded article having a contour.

After the indicia 16, 17 and corresponding conductive ink pads 22 are printed on the film 14, the film 14 is disposed in an injection mold configured for producing a control panel 10 having a desired contour. In an embodiment, the film 14 may be formed to have a desired contour, such as by using a vacuum forming technique or a pressure forming technique, such as a Niebling process. After forming, the film 14 may be die cut to a desired size. FIG. 2 is a cross section view of an exemplary plastic injection mold 30 used to produce the contoured control panel 10. The film 14 is positioned in the mold 30 so that the conductive pads 22 are in contact with a back surface 32 of the mold 30 and a space 34 remains between the front surface 18 of the flexible film 14 and a front surface 36 of the mold 30. The film 14 may include alignment holes 38 receiving film retainers, such as alignment pins 40, formed in the mold 14 and protruding into the space 34 to align the film 14 in the mold. For flat film 14, the film 14 may be bent to engage the alignment holes 38 over the alignment pins 40 so that a bent configuration of the film 14 holds it in biased engagement against the back surface 32. A molten plastic 44 may then be flowed into the space 34 in engagement with the front surface 18 of the film 14 to form a control panel 10 with the printed indicia being visible through the control panel 10 from the face 28. The mold 34 may include a inlet 44, such as an edge gate opening, spaced away from the front surface 18 of the film 14 and located so that a molten plastic 44 injected via the inlet 42 flows along the front surface 18 of the film 14 to push the film 14 against the back surface 32 of the mold 14 while filling the space 34. In an aspect of the invention, the plastic used for forming the control panel 10 may be the same type of plastic as the film 14. For example, an acrylic plastic 44 would be used to form a control panel 10 with an acrylic film 14.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of manufacturing a contoured capacitive touch screen control panel comprising:

printing control indicia on at least one of a front surface and a back surface of a flexible film;

printing conductive ink pads on a back surface of the film with each pad being aligned with respective printed control indicia;

disposing the printed film in an injection mold with the conductive pads printed on the back surface of the flexible film being in contact with a back surface of the mold so that a space remains between the front surface of the flexible film and a front surface of the mold; and flowing a molten plastic into the space in engagement with the front surface of the film to form a control panel with the printed indicia being visible through the control panel from a face of the control panel opposite from the film molded in situ.

2. The method of claim 1, wherein the conductive pad is printed using a gravure process, offset lithography, tampo printing, screen printing, or digital printing.

3. The method of claim 1, wherein the mold comprises film retainers, the method further comprising bending the film to fit the retainers so that the film is held in biased engagement against the back surface of the mold.

4. The method of claim 1, wherein the mold comprises film retainers, the method further comprising aligning the film on the film retainers.

5. The method of claim 1, further comprising forming the film to have a desired contour before disposing the film in the mold.

6. The method of claim 5, further comprising die cutting a formed film to a size sufficient for disposing the formed film in the mold.

7. The method of claim 5, wherein forming the film comprises a vacuum forming technique.

8. The method of claim 5, wherein forming the film comprises a pressure forming technique.

9. A contoured capacitive touch screen control panel comprising a film being molded in situ with the control panel, the film comprising indicia printed on at least one of a front surface and a back surface of the film and conductive ink pads printed on the back surface of the film with each pad being aligned with respective control indicia printed on the film.

10. The panel of claim 9, wherein the plastic is an acrylic or polycarbonate.

11. The panel of claim 9, wherein the film is a polycarbonate, a polyethylene terephthalate (PET), a polyester, or an acrylic.

12. The panel of claim 9, wherein the film has a thickness between about 0.1 mm and 0.2 mm.

13. The panel of claim 9, wherein film has a thickness between about 0.125 mm and 0.175 mm.

* * * * *